Figure 1:
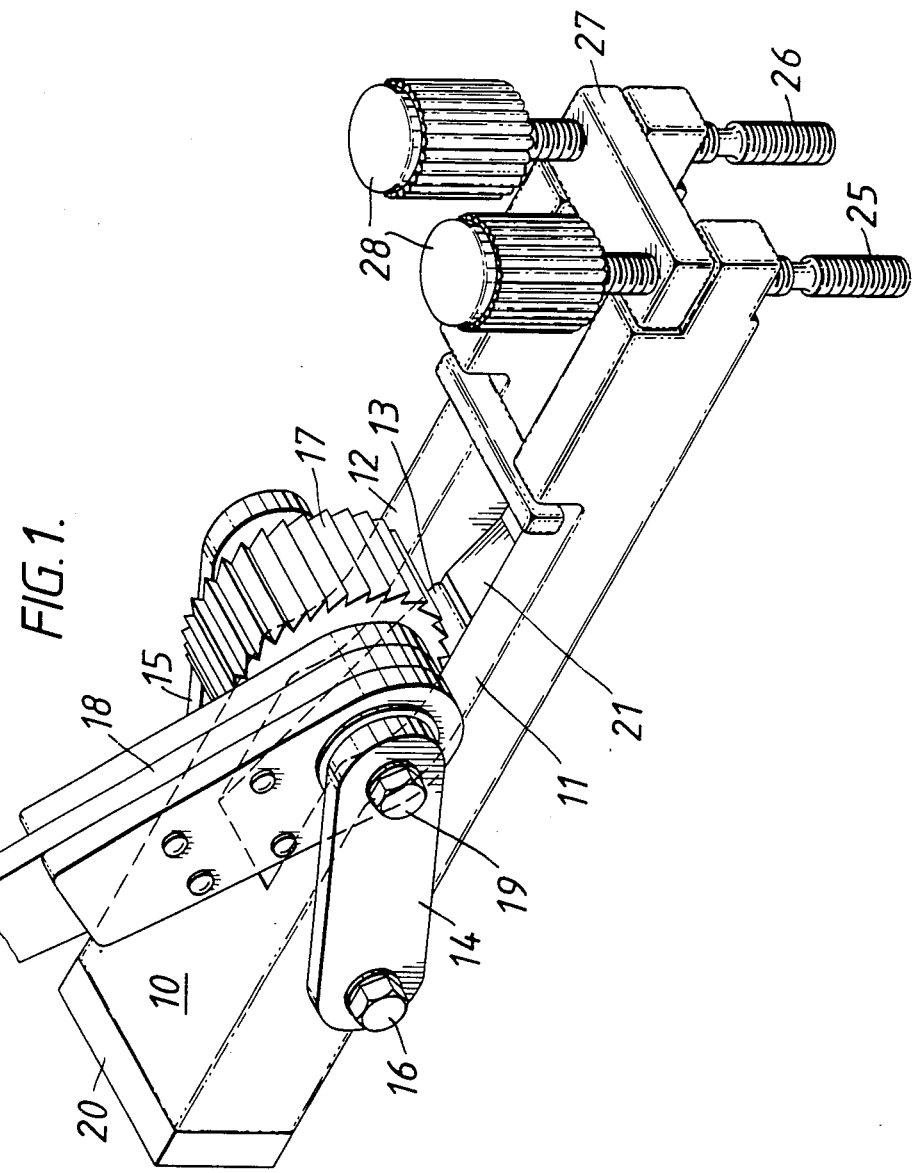

United States Patent [19]

Dickinson

[11] Patent Number: 4,727,650
[45] Date of Patent: Mar. 1, 1988

[54] BEAD STRIPPING DEVICE

[75] Inventor: Alan J. Dickinson, Cramlington, England

[73] Assignee: British Gas Corporation, London, England

[21] Appl. No.: 62,424

[22] Filed: Jun. 16, 1987

Related U.S. Application Data

[63] Continuation of Ser. No. 912,691, Sep. 26, 1986, abandoned, which is a continuation of Ser. No. 741,558, Jun. 5, 1985, abandoned.

[30] Foreign Application Priority Data

Jun. 8, 1984 [GB] United Kingdom ............... 8414642

[51] Int. Cl.$^4$ .................................................. B23D 21/06
[52] U.S. Cl. .................................... 30/94; 30/480; 30/489
[58] Field of Search .............. 30/94, 480, 481, 489, 30/495; 144/209 R, 209 A, 209 B, 209 C, 213 R, 213 A, 214, 215

[56] References Cited

U.S. PATENT DOCUMENTS

| 348,497 | 8/1886 | Long | 30/489 |
| 394,548 | 12/1888 | Anderson | 30/94 X |
| 4,494,590 | 1/1985 | Kajikawa et al. | 144/213 |

Primary Examiner—Douglas D. Watts
Attorney, Agent, or Firm—Larson and Taylor

[57] ABSTRACT

A device for removing a weld bead from the external periphery of a plastic gas pipe.

The device (FIG. 2) has a body 10 with an inclined reaction surface 13 and a blade 21. The blade 21 is engaged with a bead 22 and the portion 22a of the bead 22 which is lifted is gripped between a toothed wheel 17 and the inclined surface 21. As the wheel 17 is rotated by use of a lever 18 operating via a ratchet, the device is moved bodily around the circumference of a pipe 31 to remove the bead 22.

Retractable and adjustable stabilising means 25, 28 etc. are provided and there is a hardened end portion 20 on the body 10 to enable the device to be hammered to engage the blade in the bead initially.

6 Claims, 2 Drawing Figures

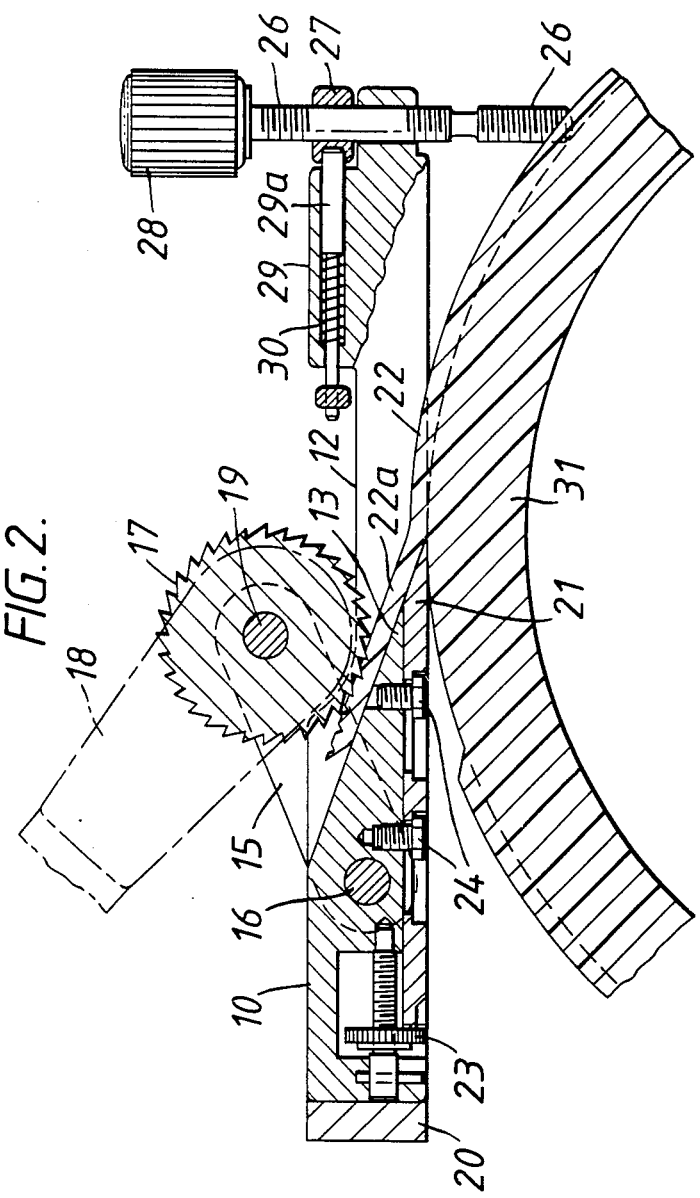

4,727,650

BEAD STRIPPING DEVICE

This application is a continuation of application Ser. No. 912,691 filed Sept. 26, 1986, now abandoned, which in turn is a continuation of application Ser. No. 741,558 filed June 5, 1985, now abandoned.

This invention relates to a bead stripping device that is to say a device for removing a weld bead from a plastic weld, for example on plastic pipes used in the gas and water industries.

In the manufacture of large plastic structures, beads form at joints in the plastic structures as a result of butt welding or moulding of the plastic structures. For example beads may be formed circumferentially around the inside and outside of plastic water or gas mains where lengths of pipe are butt welded together.

The removal of the external beads is important and, particularly on larger diameter pipes such as pipes between 250 and 1000 mm in diameter, presents a number of problems. Existing equipment designed to remove beads tends to be designed for a given size of pipe and so cannot be used universally. Furthermore most equipment of this type is not built in the form of a hand tool and is not readily portable.

An object of this invention is to provide a bead stripping device which can be used on a larger range of diameters of pipe and which can be built in the form of a hand tool.

In accordance with the present invention there is a bead stripping device comprising an elongated body, a blade attached to the underside of the body, an inclined reaction surface extending rearwardly away from the blade, and a rotary device located above and spaced from the reaction surface whereby the blade may be engaged under a portion of a bead so as to lift the bead portion and the bead may then be engaged between the rotary device and the reaction surface so that, as the rotary device is rotated, it will grip the bead and the device will be moved forward so that the blade will engage under a further portion of the bead so as to progressively remove the bead.

Preferably the device is provided with locating and stabilising means preferably in the form of adjustable stabilising screws at one end thereof. The stabilising screws are preferably provided with a quick release clamp so that they may be released from a pre-set position to allow the blade to be engaged under the bead.

Preferably also the blade is in the form of a knife blade which is adjustable longitudinally of the stripping device and has clamping means to clamp it in its adjusted position.

The rotary device is preferably in the form of a stripper wheel with teeth on its external surface and the wheel may be supported by pivoted linked arms on either side of the body of the stripping device. The wheel may have a lever attached to it so as to enable the wheel to be rotated with both the mechanical advantage of a lever and the mechanical advantage of the toothed wheel. Preferably a ratchet is provided so as to allow continuous operation of the toothed stripper wheel without disengaging the stripping device.

The body of the stripping device may have an end portion made of, for example, nylon, so that the end may be hammered in order to engage the blade under the bead.

In the accompanying drawings:

FIG. 1 is an isometric view of a bead stripping device embodying the invention; and FIG. 2 is a section through the bead stripping device.

The bead stripping device shown in FIG. 1 comprises an elongated metal body 10 divided at 11 and 12 into two portions between which is located an inclined reaction surface 13.

A pair of links 14 and 15 are provided by means of a bolt 16 to the body 10. Between the links 14 and 15 is supported a rotary toothed stripper wheel 17 attached through a ratchet device to a lever 18, the lever, ratchet device and toothed stripper wheel being journaled between the links on a bolt 19.

It will be seen that the toothed stripper wheel is located adjacent the reaction surface 13.

At one end of the body 10 is a block 20 to enable the body to be hammered so that a blade 21 located on the underside of the body 10 may be engaged into a bead 22 on a pipe 31 (see FIG. 2).

The blade 21 is adjustable by means of an adjuster nut 23 and may be clamped in its adjusted position by means of bolts 24. The body 10 has stabilising screws 25, 26 which are engaged in threads in a block 27 and have knurled adjuster nuts 28.

The stabilising screws are intended to engage the pipe so as to maintain the position of the stripper as it operates.

To facilitate use of the stripper device the stabilising screws have a quick release clamp device 29 comprising a bolt 29a engageable in a hole in the block 27. The stabilising screws and the bolt 27 may be bodily moved upwardly as shown in FIG. 2 once the quick release clamp has been retracted against pressure of spring 30. The purpose of this quick release clamp and the rapid retraction it allows of the screws is to enable the setting of the stripper device to be maintained whilst a cut in the bead is started by knocking the unstabilising tool into the bead using a hammer to hit the block 20 at one end of the device.

Once a portion 22a of the bead is raised as shown in FIG. 2 the quick release clamp is re-engaged with the stabilising screws and the rotary toothed stripper wheel is engaged with the bead portion 22 to press it against the inclined reaction surface 13. When the lever is moved (clockwise rotation as shown in FIG. 2) it will cause the tooth stripper wheel to rotate and the teeth will engage the bead thus pulling the whole device forward so that the blade 12 will engage and cut away a further portion of the bead. Thus in effect the stripper device pulls itself forward round the pipe using the bead as a guide. The ratchet allows continuous operation of the device without removal of the device from the bead. The steady pull on the bead provides a smooth cut eliminating the stick/slip action seen in other designs of bead stripper, since, when in tension between the blade and stripper wheel, the bead acts to react the cutting forces at the wheel-surface nip.

I claim:

1. A device for removing a bead from a cylindrical workpiece of synthetic thermoplastics material comprising:

a body;

a drive wheel;

peripheral surface means on said drive wheel;

mounting means on which said drive wheel is rotatably mounted and connecting the same to said body;

manually operable means connected in driving relationship with said drive wheel for turning the same;

first and second runner means on said body engageable with the external surface of said workpiece at respective circumferentially spaced apart locations one of said runner means being positionally adjustable so as to engage said external surface and thereby stabilize the position of the device as it operates;

a blade mounted on said body and defining a cutting edge;

ramp surface means on said body extending back from said cutting edge, said ramp surface means being inclined so as to support thereon a free portion of said bead after the same has been cut by said blade and separated away from said workpiece;

and said manually operable means being operable to turn said drive wheel with said peripheral surface thereon engaging a first outer surface of said free portion of said bead in pulling, driving relationship therewith, a second minor freshly cut surface of said free portion being forced thereby to slide along said ramp surface means away from said cutting edge, which edge is thereby driven with said device as it pulls itself around said workpiece to cut said bead therefrom as said first and second runner means run around said workpiece upon said external surface thereof.

2. A device according to claim 1 said first runner means comprising spaced apart skid surface means between which said cutting edge extends.

3. A device according to claim 1 said second runner means comprising spaced apart screw means having respective terminal runner skid surfaces running on said external surface of said workpiece.

4. A device according to claim 3 comprising quick release clamp means which are operable to hold said screw means in either a first position in which the screw means are retracted to facilitate initial penetration of said bead by said cutting edge and severance of an initial free portion of said bead preparatory to engagement thereof by said drive wheel, and a second position in which said screws are advanced and said body moves around said workpiece with said runner means running around said external surface thereof.

5. A device according to claim 1 said mounting means comprising a pair of links between first like ends of which said drive wheel is rotatably mounted, second like ends of said links being pivotally secured to said body about an axis parallel to the axis of rotation of said drive wheel, said links being inclined relatively to said ramp surface means to cause the reaction exerted by said free portion of said bead on said portion of said peripheral surface of said drive wheel to force the same against said free portion of said bead.

6. A device according to claim 3 said body comprising a pair of limbs side-by-side and spaced apart to accommodate said blade and said ramp surface means therebetween, said drive wheel entering between said limbs to engage said free portion of said bead between said limbs, said limbs defining two co-planar spaced-apart like runner limb surfaces forming said first runner means substantially co-planar with said cutting edge, like ends of said limbs ahead of said cutting edge supporting said screw means, said runner limb surface and said terminal skid surfaces straddling said bead in each case.

* * * * *